United States Patent
Berghoff

(10) Patent No.: US 6,254,378 B1
(45) Date of Patent: *Jul. 3, 2001

(54) INJECTION MOLDING APPARATUS

(75) Inventor: Hans Lothar Berghoff, Singapore (SG)

(73) Assignee: Fastech Systems (S) Pte Ltd. (SG)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/171,660
(22) PCT Filed: Apr. 24, 1997
(86) PCT No.: PCT/SG97/00016
 § 371 Date: Mar. 23, 1999
 § 102(e) Date: Mar. 23, 1999
(87) PCT Pub. No.: WO97/39873
 PCT Pub. Date: Oct. 30, 1997

(30) Foreign Application Priority Data

Apr. 25, 1996 (SG) ................................. 9609523-7
Sep. 28, 1996 (SG) ................................. 9610761-0

(51) Int. Cl.⁷ .................................. B29C 45/64
(52) U.S. Cl. .................. 425/590; 425/451.2; 425/451.7; 425/595
(58) Field of Search .................... 425/229, 190, 425/192 R, 590, 595, 451.2, 451.7, 451.9

(56) References Cited

U.S. PATENT DOCUMENTS

| | | | |
|---|---|---|---|
| 4,332,537 | * 6/1982 | Slepcevic | 425/588 |
| 4,480,975 | * 11/1984 | Plummer et al. | 425/116 |
| 4,575,328 | * 3/1986 | Fierkens et al. | 425/193 |
| 4,687,431 | 8/1987 | Stengelin | 425/229 |
| 4,968,239 | * 11/1990 | Inaba et al. | 425/451.7 |
| 5,053,172 | 10/1991 | Yamasaki et al. | 264/39 |
| 5,378,140 | * 1/1995 | Asano et al. | 425/451.7 |
| 5,622,737 | * 4/1997 | Hehl | 425/451.7 |
| 5,698,240 | * 12/1997 | Haguchi | 425/451.2 |

* cited by examiner

*Primary Examiner*—James P. Mackey
(74) *Attorney, Agent, or Firm*—Burns, Doane, Swecker & Mathis, L.L.P.

(57) ABSTRACT

An integrated circuit encapsulation apparatus comprises a molding press, which has a mold defining a cavity adapted to receive an integrated circuit die and an attached leadframe for encapsulation thereof. The molding press is operable by an electro-pneumatic driving mechanism which utilises a geared servo motor for opening and closing the mold, and a pneumatic cylinder for providing clamping pressure. Both the servo motor and pneumatic cylinder act upon a threaded screw member for movement of the molding press. The press is provided with an integrated mold brushing unit which has transversely rotating brushes and travels over the mold faces to remove debris. In a further refinement, a spring-loaded bearing system is provided for easy removal of the mold.

6 Claims, 4 Drawing Sheets

INJECTION MOLDING APPARATUS

This invention relates to apparatus for injection molding, for example, for encapsulating integrated circuits.

BACKGROUND OF THE INVENTION

In the electronics manufacturing industry, a high degree of cleanliness is required to prevent contamination of circuitry and devices, which may cause subsequent electronic failure. A common way of packaging electronic integrated circuits is by encapsulating the prefabricated integrated circuit and a portion of the attached leadframe in a plastics material. Typically this is performed utilising injection molding apparatus, often of the transfer mold variety. Known injection molding equipment employs hydraulic presses, and it is not uncommon for hydraulic fluids to leak from the hydraulic presses, which may contaminate the molds and molded products. Although cleansing of the molds is performed regularly, the cleaning techniques are not always effective in removing contaminating debris from the molds. Furthermore, removal of molds for cleaning is often difficult and time consuming. It is an object of the present invention to overcome these problems.

BRIEF SUMMARY OF THE INVENTION

Accordingly the present invention provides an injection molding apparatus, comprising a molding press adapted to receive a mold having a cavity shaped for the formation of a molding product, the molding apparatus comprising: first and second platens which are movable relative to one another so as to allow respective mold parts mounted thereon to be moved between open and closed configurations; and an electro-pneumatic drive mechanism comprising: a threaded screw member coupled to one of the first and second platens; an electric motor coupled to drive the threaded screw member by way of a gear mechanism for moving the first and second platens relative to one another; and a pneumatic cylinder mechanism for driving the screw thread of the threaded member separately from said electric motor.

The present invention is particularly well adapted for use in an integrated circuit encapsulation process.

Preferably, the mold is provided with a spring-loaded bearing system for easy removal of the mold from the press.

BRIEF DESCRIPTION OF THE DRAWINGS

The invention is described in greater detail below by way of example only, with reference to the accompanying drawings in which:

FIGS. 1A, 1B and 1C are cross-sectional views of an exemplary transfer molding press 1 adapted to receive two molds 2. Each mold 2 is arranged within the molding press 1, and comprises upper and lower mold parts 2a, 2b which fit together to define a mold cavity 4.

DETAILED DESCRIPTION OF THE PREFERRED EMBODIMENTS

Figure 1A:
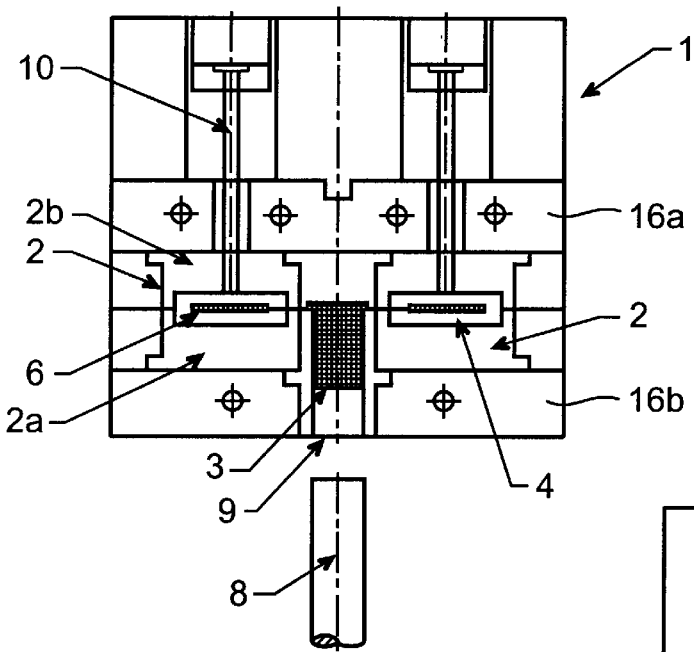
FIGS. 1A, 1B and 1C are respective cross-sectional views through an exemplary molding press illustrating the operation for encapsulating an integrated circuit and leadframe.
Figure 1B:
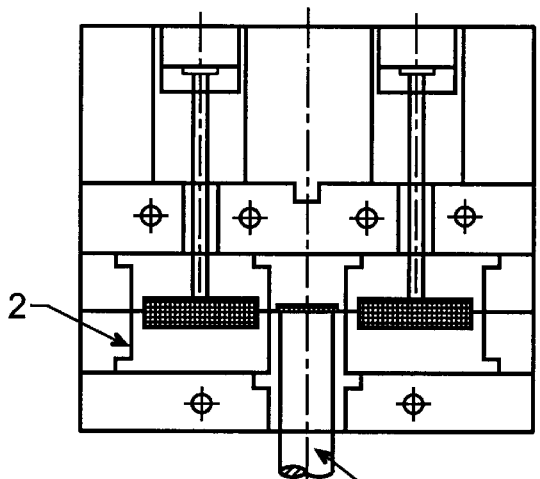

The molding press 1 is shown in FIG. 1A in a closed position, having been loaded with integrated circuit leadframes 6 within the respective mold cavities 4, and a pellet of encapsulating material 3 in a gangpot 9. Encapsulation of the integrated circuits 6 is achieved by heating the encapsulating material pellet 3 and pressing it within the gangpot using a transfer plunger 8, which causes the pellet 3 to liquefy and flow into the mold cavities 4 through small passages between the gangpot and the mold cavities (see FIG. 1B). After allowing the encapsulating material to solidify again, the molding press 1 is opened (FIG. 1C), wherein the mold parts 2a, 2b are separated. The encapsulated integrated circuits 7 are lifted from the mold cavity by way of ejector pins 10, so as to expose them for removal from the molding press. After removal of the encapsulated integrated circuits 7, the open molding press is ready to receive new leadframe inserts 6 and encapsulating material pellet 3 to repeat the encapsulating process.

Figure 1C:
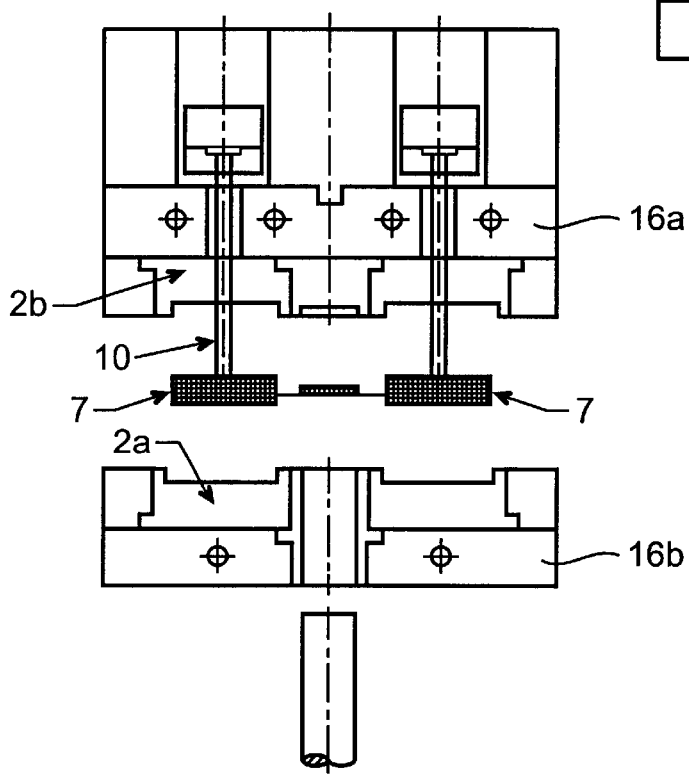

In order to move the mold parts 2a, 2b towards and away from each other between the open and closed configurations illustrated in FIGS. 1C and 1A, respectively, a driving mechanism is required. The upper and lower mold parts 2a, 2b are respectively mounted on upper and lower platens 16a, 16b of the molding press, and the upper and lower platens are movable relative to one another along linear guide rods 20 (see FIG. 2B). Typically hydraulic driving mechanisms have been employed for movement of the molding press platens, and in the electronics encapsulation industry, at least, such driving mechanisms are subject to disadvantages as discussed hereinabove. However, hydraulic driving mechanisms have persisted even in the electronics encapsulation industry because other characteristics of the hydraulic systems make them well suited to the requirements for driving molding presses. In particular, hydraulic systems are able to easily provide a sufficient range of relative movement of the platens to permit access to the mold cavities when separated, and also enable generation of a sufficiently large clamping force between the mold parts when the press is closed.

Figure 2A:
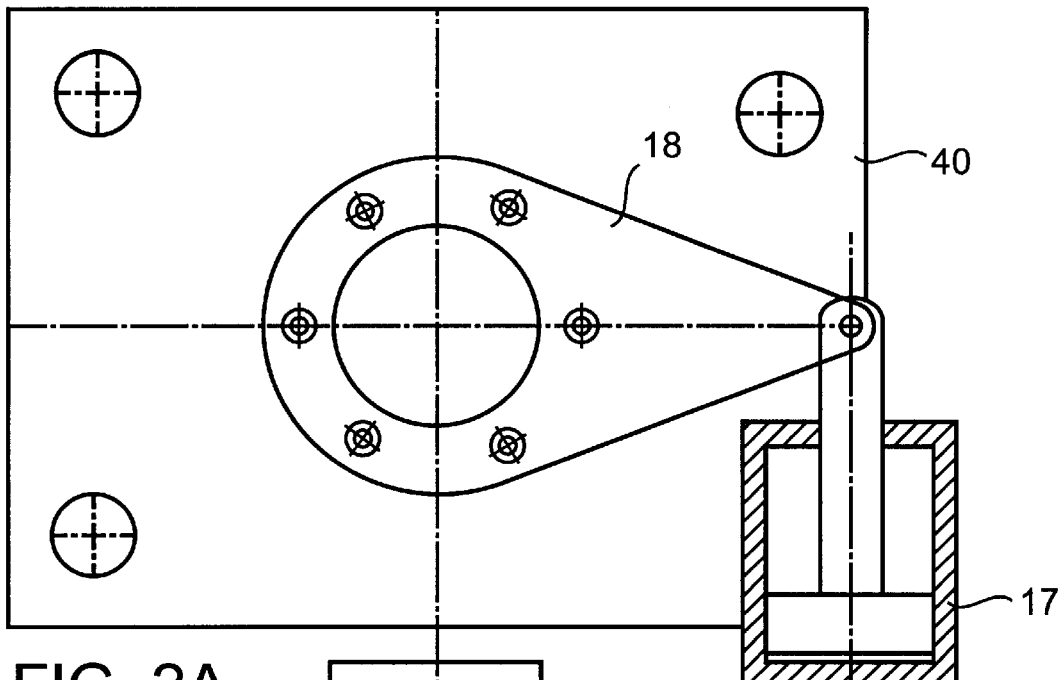
FIGS. 2A and 2B show a plan and cross-sectional elevation view respectively of an electro pneumatic press.
Figure 2B:
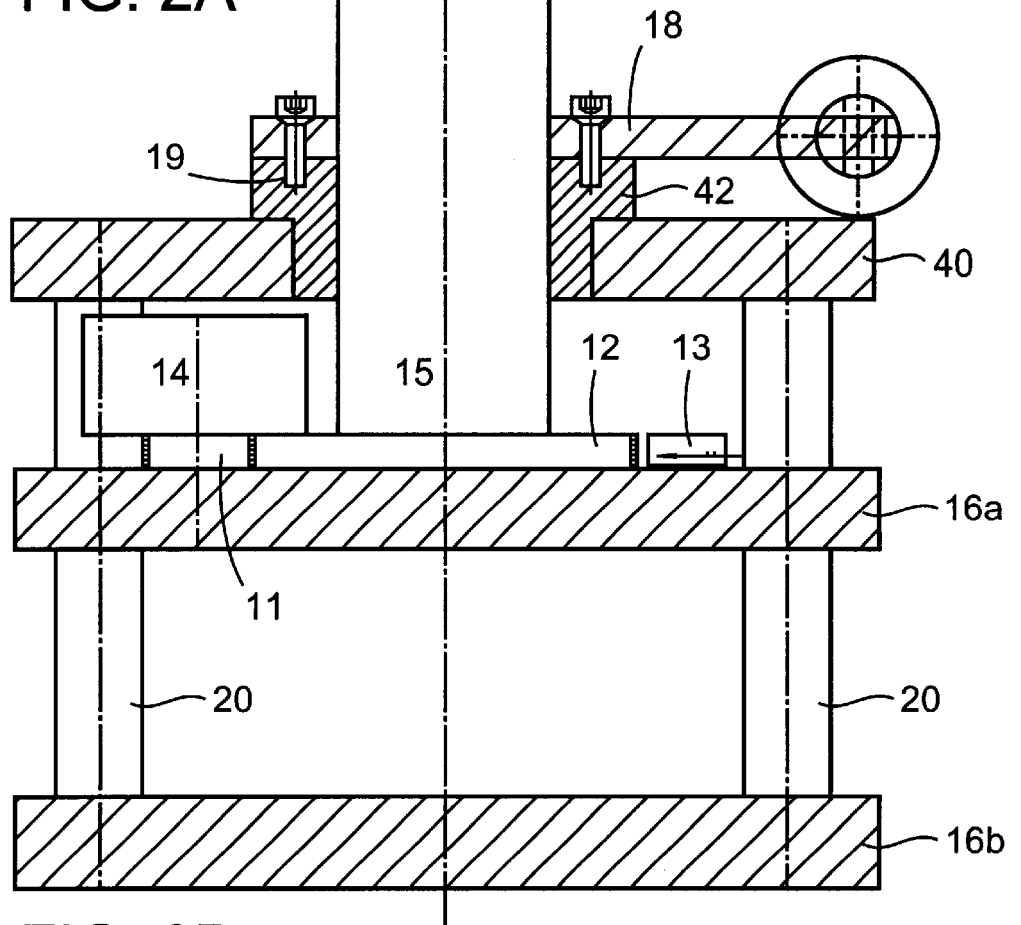

The molding press driving mechanism of the present invention is able to provide the range of movement and force requirements of the molding press, but without the deleterious effects which can result from the prior art hydraulic driving systems. A particular preferred form of the molding press driving mechanism is illustrated in FIGS. 2A and 2B, in plan and cross-sectional elevation views, respectively. Representations of the upper and lower mold press platens are shown at 16a and 16b (FIG. 2B), mounted for relative movement along guide rods 20. In this driving mechanism, it is the upper platen 16a which is in fact movable along the guide rods 20, to effect displacement relative to the lower platen 16b which is fixed to the guide rods. The driving mechanism comprises an electro-pneumatic system, since the two operative components are an electrically activated servo motor and a pneumatically motivated cylinder and piston arrangement.

The upper platen 16a has an elongate ball-screw 15 mounted thereon, centrally arranged on top of the platen and rotatable about a central axis. The ball-screw 15 extends parallel to the guide rods 20 away from the lower platen 16b, and has an external screw thread formed thereon. A fixed frame plate 40 is mounted at the top of the guide rods 20 having a central aperture aligned with the ball-screw 15. Within the central aperture is mounted a flange member 42 which is fixed to prevent movement thereof relative to the frame plate 40 in the axial direction of the ballscrew, but to allow rotational movement about the ball-screw axis. The flange member 42 has a circular internally threaded opening, and the ball-screw 15 extends through the opening with the internal and external screw threads of the ball-screw and flange member interfitting. Accordingly, relative rotational movement between the ball-screw 15 and flange member 42 is translated into axial movement of the ball-screw relative to the frame plate, the direction of rotation determining the direction of axial movement. In view of the construction, therefore, relative rotational movement between the ballscrew 15 and the flange member results in relative linear movement of the upper platen 16a, with respect to the lower platen 16b, along the guide rods 20.

As mentioned, the electro-pneumatic driving mechanism provides two active components, namely an electric servo motor 14, and a pneumatic piston and cylinder arrangement 17. Both the electric and pneumatic active components operate upon the ball screw arrangement above described, but provide different functions. In particular, the servo motor 14 is arranged to provide the required range of relative movement of the platens to permit sufficient access to the mould cavities when separated, whilst the pneumatic piston and cylinder is arranged to provide a sufficiently large clamping force between the mold parts when the press is closed.

Adjacent the top of the upper platen 16a, a gear cog 12 is mounted for axial movement with the ball-screw 15. The gear cog 12 intermeshes with a driving cog 11 which is driven by the servo motor 14 mounted on the upper platen 16a. Accordingly, driving the servo motor 14 rotates the driving cog 11 which thereby causes rotational movement of the gear cog 12 and ball screw 15. As discussed above, this rotational movement results in linear axial movement of the ball-screw 15 and upper platen 16a, relative to the lower platen 16b. Thus, by controllably driving the servo motor 14, the upper platen 16a can be moved relative to the lower platen 16b to, in use, open and close the molds of the molding press. Whilst the ball-screw 15 is driven by the servo motor 14 the flange member 42 of course remains stationary.

When the molds of the molding press are positioned in the closed configuration by action of the servo motor 14, it is then desired to ensure that sufficient clamping force is applied between the upper and lower mold parts. This function is provided by the pneumatic cylinder and piston arrangement 17. A lever arm 18 is fitted to the flange member 42 by way of connecting bolts 19, and a movable end of the piston of the cylinder and piston arrangement 17 is coupled to the end of the lever arm 18. This arrangement enables movement of the piston by action of increased pneumatic pressure in the cylinder 17 to be translated to rotational movement of the lever arm 18, and thus to the flange member 42. An interlocking device 13 is also provided adjacent the gear cog 12, which is operable to interlock with the gear cog 12 to prevent rotation thereof as well as the ball screw 15. Thus, motion of the piston 17 which results in rotational movement of the lever arm 18 and flange member is translated to axial movement of the ball screw 15. However, because of the nature of the mechanism the pneumatic cylinder is only able to produce a small rotational movement of the flange member 42, which results in only a small axial movement of the upper platen, although significant clamping force can nevertheless be generated.

Utilising the construction of the driving mechanism illustrated in FIGS. 2A and 2B, the servo motor 14 is able to be controlled so as to move the upper and lower latens 16a, 16b apart and together between open and closed configurations of the molds. When the servo motor is controlled so as to configure the molds into a closed configuration, then the pneumatic cylinder 17 can be activated by increasing the gas pressure therein so as to rotate the flange member relative to the ball screw 15. This action, combined with activation of the interlocking device 13 to prevent rotation of the ball screw 15 enables a clamping pressure to be applied by the pneumatic cylinder 17.

Figures 3A, 3B:
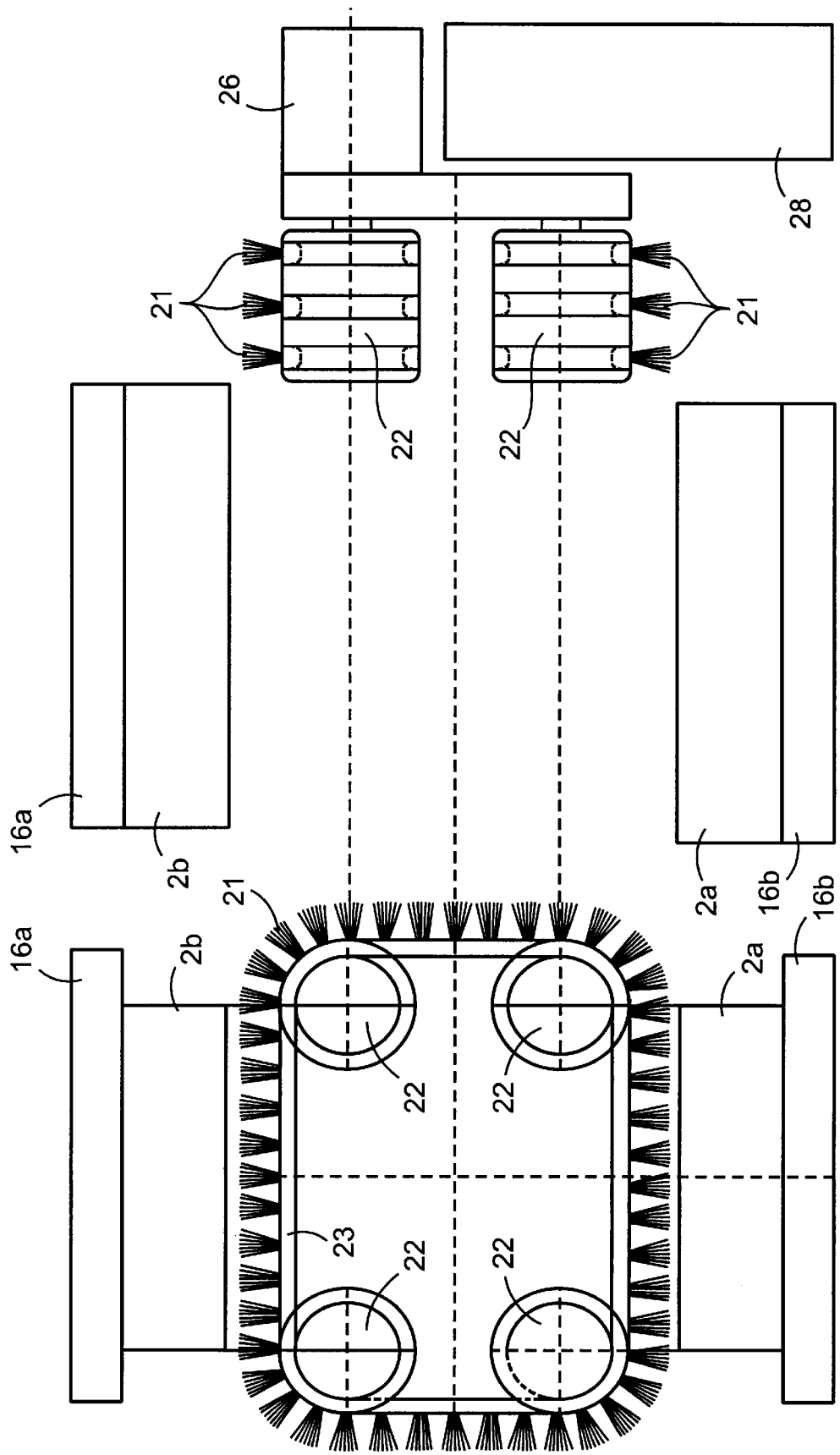
FIGS. 3A and 3B show an elevation and side cross-sectional elevation respectively of a mold brushing system.

In FIG. 3A, heat resistant brushes 21 are mounted along a series of parallel endless V-belts 23 which run on pulleys 22. A motor 28 drives the pulleys 22 through a drive mechanism 26. When the mold is opened, the brushing unit rotate in one direction is movable axially of the pulleys 22 (ie. transverse to the movement of brushes 21) across the mold-face brushing any debris away from the mold and then rotate in the another direction during the returning stroke of the cleaning process. The rotation of the brushes about a horizontal axis as the translation occurs provides a more effective cleaning action than that of known cleaning methods which have brushes rotating about vertical axes.

Figure 4B:
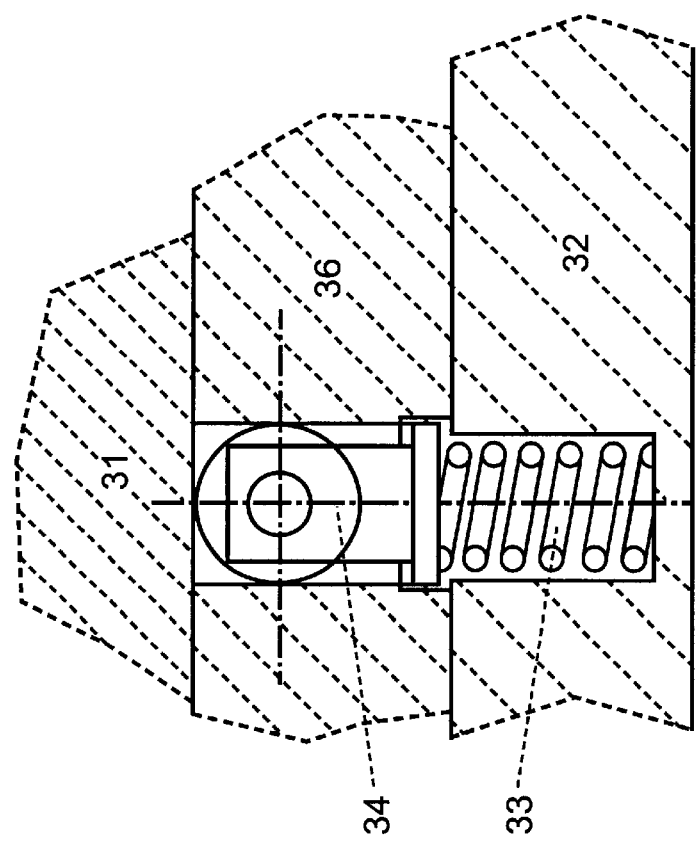
FIGS. 4A and 4B are cross-sectional views showing a spring-loaded bearing system for removing the mold.
Figure 4A:
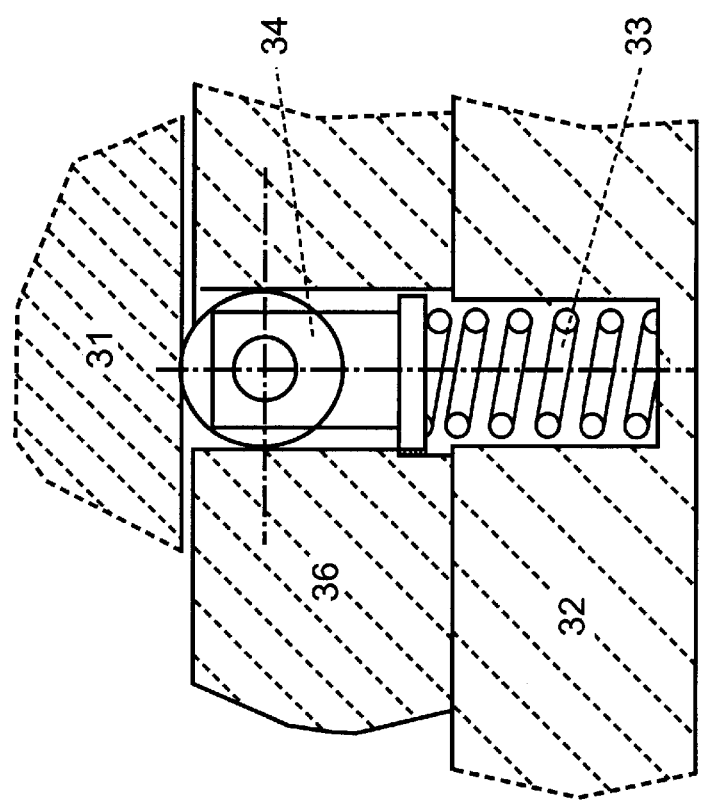

In FIGS. 4A and 4B, a roller-bearing system 34 is mounted in the press-table 36 and is loaded with a spring 33 set in the base plate 32. When the mold 31 is tightened, it depresses the spring 33 and sits in contact with the press table 36. When the mold is released, the spring 33 uncoils and raises the mold above the press table 36 allowing easy removal. The temperature of the mold which can be as high as 180° C. makes mold changing a difficult operation and this system increases the speed of changing considerably. As shown in FIG. 4A, the strength of springs 33 is such as to elevate the mold 31 by pressure of the bearings 34 to about 1 mm above the surface of the press table 36. It will be immediately apparent that the bearings 34 may be of a form comprising rollers, or incorporating a ball bearing to allow two dimensional relative movement between the press table and mold, as will be appreciated by those skilled in the art. It is of course obvious that the roller-bearing system would be incorporated in the lower platen 16b, and that the base plate 32 and press table 36 may comprise components thereof.

The above detailed description is by way of example only, and is not intended to limit the scope of the invention which is defined in the following claims.

The claims defining the invention are as follows:

1. An injection molding apparatus comprising:

a frame;

a first platen and a second platen, the first platen and the second platen adapted to receive a mold having mold parts that form a cavity shaped for the formation of a molding product wherein the first platen is movable relative to the second platen and said frame, so as to allow the mold parts mounted on said first and second platens to be moved between an open position and a closed position;

a first drive mechanism including an electric motor and a gear mechanism coupled to the electric motor and mounted on said first platen;

a threaded screw coupled to the first platen, the threaded screw being engaged with the gear mechanism whereby a rotary force generated by the motor drives the threaded screw for moving the first platen relative to said second platen and said frame;

a flange mounted on said frame and threadedly engaged with the threaded screw;

a pneumatic cylinder and a lever mechanism mounted on said frame and arranged to apply torque through the lever mechanism to the flange threadedly engaged with the threaded screw to provide a clamping force between the mold parts when said mold is in the closed position; and wherein the pneumatic cylinder and the lever mechanism drive a portion of the threaded screw independently of the electric motor.

2. The injection molding apparatus as claimed in claim 1, wherein the threaded screw has a length and an axis with an axial direction along said length, said frame has a frame plate and the flange has a circular internally threaded opening for threadedly receiving the threaded screw, the flange being fixed to the frame plate to prevent movement thereof relative to the frame plate in an axial direction of the threaded screw, but to allow rotational movement about said axis of the threaded screw.

3. The injection molding apparatus as claimed in claim 1, wherein the pneumatic cylinder includes a piston rod, and wherein the lever mechanism is fixedly connected to the flange and is adapted to be activated by the piston rod of the pneumatic cylinder.

4. A molding apparatus, comprising:

a frame;

a first platen and second platen, the first and the second platens being adapted to receive a mold having mold parts that form a cavity shaped for the formation of a molded product, wherein the first platen is movable relative to the second platen and said frame, so as to allow the mold parts mounted on the first and second platens to be moved between an open position and a closed position;

a first drive mechanism;

a threaded screw coupled to the first platen and to said first drive mechanism, whereby a rotary force generated by said first drive mechanism drives the threaded screw to move said first platen relative to said second platen and said frame; and a second drive mechanism including a lever and arranged to apply torque through said lever to the threaded screw to provide a clamping force between the mold parts when said mold parts are in the closed position;

wherein the first drive mechanism and the second drive mechanism are operable to drive the threaded screw independently; and wherein one of said first drive mechanism and said second drive mechanism is mounted on said frame and the other of said first drive mechanism and said second drive mechanism is mounted on said first platen.

5. The molding apparatus as claimed in claim 4, wherein said threaded screw has length and an axis with an axial direction along said length;

said frame has a frame plate and nut with a circular internally threaded opening threadedly receiving the threaded screw;

said nut is mounted in said frame plate to prevent movement thereof relative to the frame plate in an axial direction of the threaded screw, but to allow rotational movement about the axis of said threaded screw; and the nut is rotated by the one of said first drive mechanism and said second drive mechanism mounted on said frame to drive said threaded screw in the axial direction of the threaded screw.

6. The molding apparatus as claimed in claim 5, wherein the second drive mechanism further includes a cylinder including a piston rod, and wherein the lever is fixedly connected to the nut and is adapted to be activated by said piston rod of the cylinder.

* * * * *